US009594359B2

(12) United States Patent
Mohideen et al.

(10) Patent No.: US 9,594,359 B2
(45) Date of Patent: Mar. 14, 2017

(54) FEEDBACK CONTROL FOR REDUCING FLARING PROCESS SMOKE AND NOISE

(71) Applicant: HONEYWELL INTERNATIONAL INC., Morristown, NJ (US)

(72) Inventors: Mohammed Ibrahim Mohideen, Karnataka (IN); Madhukar Madhavamurthy Gundappa, Karnataka (IN); Mahesh Gellaboina, Andhra Pradesh (IN); Viswanath Talasila, Karnataka (IN)

(73) Assignee: Honeywell International Inc., Morristown, NJ (US)

( * ) Notice: Subject to any disclaimer, the term of this patent is extended or adjusted under 35 U.S.C. 154(b) by 411 days.

(21) Appl. No.: 14/252,156

(22) Filed: Apr. 14, 2014

(65) Prior Publication Data

US 2015/0293506 A1    Oct. 15, 2015

(51) Int. Cl.
| | |
|---|---|
| *G05D 3/12* | (2006.01) |
| *G05B 13/04* | (2006.01) |
| *G05B 17/02* | (2006.01) |
| *F23G 5/50* | (2006.01) |
| *F23G 7/08* | (2006.01) |

(52) U.S. Cl.
CPC ............ *G05B 13/048* (2013.01); *F23G 5/50* (2013.01); *F23G 7/08* (2013.01); *G05B 17/02* (2013.01); *F23J 2900/11002* (2013.01); *F23N 2023/40* (2013.01); *F23N 2023/44* (2013.01); *F23N 2029/20* (2013.01)

(58) Field of Classification Search
CPC .................................. G05B 13/048
USPC ............................... 700/275–285
See application file for complete search history.

(56) References Cited

U.S. PATENT DOCUMENTS

| 4,094,632 | A | * | 6/1978 | Reed ................. F23G 7/085 |
| | | | | 422/182 |
| 4,265,200 | A | * | 5/1981 | Wessel ............. F02D 41/2403 |
| | | | | 123/487 |

(Continued)

FOREIGN PATENT DOCUMENTS

JP    2005265361    9/2005

OTHER PUBLICATIONS

Szklo, Alexandre, and Roberto Schaeffer. "Fuel specification, energy consumption and CO 2 emission in oil refineries." Energy 32.7 (2007): pp. 1075-1092.*

(Continued)

*Primary Examiner* — Satish Rampuria
(74) *Attorney, Agent, or Firm* — Jetter & Associates, P.A.

(57) ABSTRACT

A method of reducing plant emissions includes providing a MPC model for a flaring process including one-to-one models between controlled variables (CVs) including a smoke count and/or a flare count (CV1) and a noise level (CV2), and flow of assist gas as a manipulated variable (MV) and another process gas flow as a disturbance variable (DV). The MPC model receives sensed flare-related parameters during the flaring process including a measure of CV1 (CV1*) and CV2 (CV2*). Provided CV1* is above a minimum setpoint for CV1 (CV1 setpoint) and CV2* is above a setpoint for CV2 (CV2 setpoint), the flaring process is automatically controlled using the MPC model which determines an updated flow setpoint for MV from CV1* and CV2*, the CV1 and CV2 error, and the identified one-to-one models.

20 Claims, 3 Drawing Sheets

(56) References Cited

U.S. PATENT DOCUMENTS

| | | | | |
|---|---|---|---|---|
| 4,505,668 | A | * | 3/1985 | DiBiano ................ F23G 7/085 431/202 |
| 6,149,071 | A | * | 11/2000 | MacCallumMhor G05D 7/0635 239/67 |
| 7,536,232 | B2 | * | 5/2009 | Boyden ................ G05B 13/048 422/111 |
| 7,876,229 | B2 | | 1/2011 | Rao et al. |
| 8,627,668 | B2 | | 1/2014 | Thompson |
| 2004/0112046 | A1 | * | 6/2004 | Tumati ................ F01N 3/0256 60/297 |
| 2008/0233523 | A1 | * | 9/2008 | Diepenbroek ............ F23G 5/50 431/14 |
| 2009/0317754 | A1 | | 12/2009 | McFatter, II |
| 2011/0195364 | A1 | | 8/2011 | Tullos |
| 2013/0030554 | A1 | * | 1/2013 | MacArthur .......... G05B 13/048 700/29 |
| 2014/0266740 | A1 | * | 9/2014 | Fernandes .......... G05B 23/0224 340/577 |
| 2015/0260397 | A1 | * | 9/2015 | Talasila .................. F23N 5/242 431/14 |

OTHER PUBLICATIONS

Tam, Patrick S., James R. Kittrell, and John W. Eldridge. "Desulfurization of fuel oil by oxidation and extraction. 1. Enhancement of extraction oil yield." Industrial & Engineering Chemistry Research 29.3 (1990): pp. 321-324.*

Von Storch, Hans, et al. "Four decades of gasoline lead emissions and control policies in Europe: a retrospective assessment." Science of the Total Environment 311.1 (2003): pp. 151-176.*

Mashour, Mazen, et al. "Success Stories: Saudi Aramco High Pressure Air Assist System (HPAAS) for Smokeless Flaring." American Flame Research Committee Pacific Rim Combustion Symposium, Maui, USA. 2010.pp. 1-16.*

Castineira, David, Blake C. Rawlings, and Thomas F. Edgar. "Multivariate image analysis (MIA) for industrial flare combustion control." Industrial & Engineering Chemistry Research 51.39 (2012): pp. 12642-12652.*

Angle, Randolph P. "Industrial Emissions Management." Air Quality Management. Springer Netherlands, 2014. pp. 187-202.*

* cited by examiner

|  | MV (ASSIST GAS FLOW) | DV (PROCESS GAS FLOW) |
|---|---|---|
| CV-1 (SMOKE OR FLARE) | M1 | M2 |
| CV-2 (NOISE) | M3 | M4 |

FIG. 2

FEEDBACK CONTROL FOR REDUCING FLARING PROCESS SMOKE AND NOISE

FIELD

Disclosed embodiments relate to control of flaring processes including modeling of flaring characteristics in terms of process variables and application of a feedback control mechanism to reduce at least the smoke generated by the process.

BACKGROUND

In process industries such as petroleum (oil) refineries and petrochemical plants, it is a common practice to burn the exhaust gases of a stage of the refinery or plant with a steam-assisted, combustible gas assisted or air assisted flare tip before releasing them to the atmosphere in order to reduce the environment pollution in a process generally referred to as "flaring" or "flare". Flaring is generally performed only as a year-end process for several weeks up to about one month. More generally, flaring as commonly used in the petrochemical and oil industry is a volatile organic compound (VOC) combustion process used to safely dispose of flammable waste gases from emergency process upsets as well as during process start-up, process shut-down and turnaround operations. Flaring helps prevent the release of toxic hydrocarbons into the atmosphere. However, combustion of hydrocarbons is seldom 100% complete leading to back smoke (hereafter "smoke") production due to inefficient combustion of the hydrocarbons which can result in significant financial costs due to the burning of valuable hydrocarbons, as well as flare induced noise (or sound) production (either combustion noise or steam injection noise).

Regulatory authorities (e.g., the U.S. Environmental Protection Agency (EPA)) generally impose environmental regulations in terms of monitoring and controlling both smoke and noise. In general smoke reduction has the highest priority, but in locations where the refineries are located relatively close to residential communities, noise reduction can be important too. Failure to adhere to EPA or other regulations can result in the imposition of serious financial penalties and sometime revoking of operating licenses for the owner of the process.

The main role of a flare monitoring and control device or system is to monitor and measure certain parameters of the flare such as amount/volume of the smoke, size of the flare, and noise level (typically in dB), and take certain countermeasures to control the flare so as to ensure compliance with EPA smoke and noise level regulations. A few products and research exists for in-situ and remote sensor-based flare monitoring. For example, systems based on thermocouples, infrared (IR) sensors or a video camera can be used for indicating the presence or absence of smoke and to some extent the quantity of smoke. However, the control action, such as controlling the steam or other assist gas flow to the process to reduce smoke, remains a manual task.

SUMMARY

This Summary is provided to introduce a brief selection of disclosed concepts in a simplified form that are further described below in the Detailed Description including the drawings provided. This Summary is not intended to limit the claimed subject matter's scope.

Disclosed embodiments include systems and Model Predictive Control (MPC) model-based methods and for reducing emissions of both smoke and noise during a gas-assisted flaring process at a processing plant. Disclosed embodiments recognize plant design enhancements such as changes to the flare tip at process industries such as petroleum (oil) refineries and petrochemical plants cannot largely solve the problem of smoke/noise, as the flare tip performance degrades over a period of time, such as due to a changing variety of process gas stream (gas mixture) that is burnt at the flare stack. It is also recognized a feedback control mechanism can instead be used to tackle the problem of minimizing both the smoke and noise emission levels.

Disclosed embodiments provide automated flare control methods to model flaring events including smoke and noise in a multivariable sense, as the respective one-to-one models of the MPC model used for disclosed embodiments are interacting with one another, which allows control the assist gas flow using a model-based controller employing a disclosed MPC model. The assist gas can be steam, a combustible gas such a natural gas or propane, or another gas such as air. Sensors and related electronics are combined with feedback control and mathematical modeling to provide a plurality of one-to-one models within the MPC model, where the MPC model provides feedback control of the assist gas flow to reduce both smoke and keep noise to keep them both under predetermined limits, such as regulatory authority' limits (e.g., the U.S. Environmental Protection Agency (EPA)).

One disclosed embodiment comprises a method of reducing emissions at a processing plant including providing a MPC model for a flaring process including an assist gas from a plurality of one-to-one models between controlled variables (CVs) including a smoke count and/or a flare count (CV1) and a noise level (CV2), and a flow of an assist gas as a manipulated variable (MV), and another process gas flow as a disturbance variable (DV). The MPC model receives sensed flare-related parameters during the flaring process including a measure of CV1 (CV1*) and a measure of CV2 (CV2*), and optionally a value of the disturbance variable (DV*) from a suitable flow sensor. Provided CV1* is above a minimum setpoint for CV1 (CV1 setpoint) and CV2* is above a setpoint for CV2 (CV2 setpoint), the flaring process is automatically controlled by a process controller using the MPC model which automatically determines an updated flow setpoint for MV (updated MV future moves) based on CV1* and CV2*, the CV1 error and CV2 error, and (iii) the identified one-to-one models. The DV can be measured or estimated to support one-to-one models including the DV(s). If the DV is not measured or estimated, the one-to-one models do not include the DV, and the MPC model can treat the effect of DV on MV as a plant-model mismatch.

BRIEF DESCRIPTION OF THE DRAWINGS

FIG. 2 is a table showing four (4) example one-to-one process models that can be used for building a disclosed MPC model, according to an example embodiment

DETAILED DESCRIPTION

Figure 1:
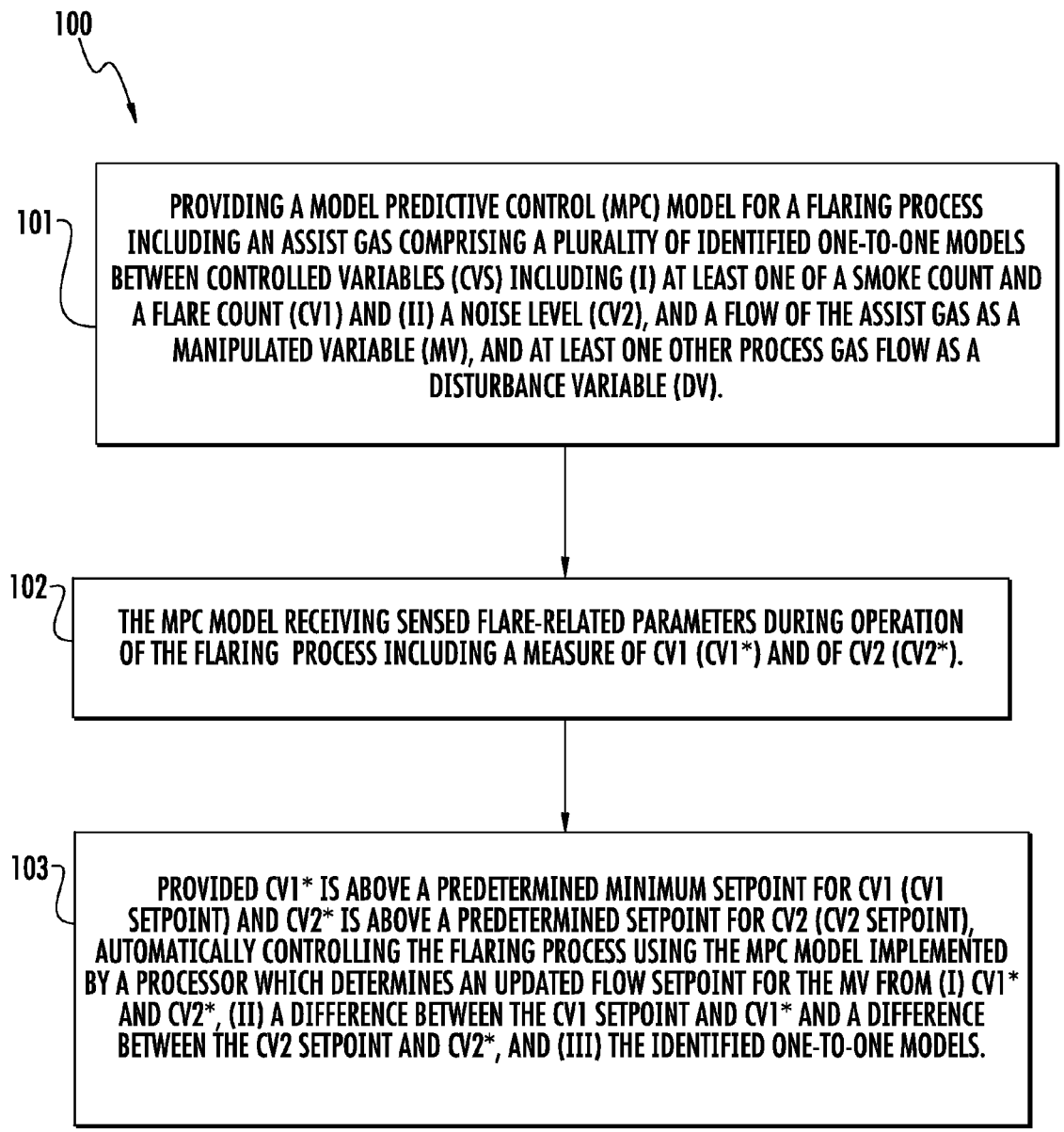
FIG. 1 is a flow chart that shows steps in an example method for reducing both smoke and noise emissions at a process industry utilizing a flaring process, according to an example embodiment.

Disclosed embodiments are described with reference to the attached figures, wherein like reference numerals are used throughout the figures to designate similar or equivalent elements. The figures are not drawn to scale and they are provided merely to illustrate certain disclosed aspects. Several disclosed aspects are described below with reference to example applications for illustration. It should be understood that numerous specific details, relationships, and methods are set forth to provide a full understanding of the disclosed embodiments.

One having ordinary skill in the relevant art, however, will readily recognize that the subject matter disclosed herein can be practiced without one or more of the specific details or with other methods. In other instances, well-known structures or operations are not shown in detail to avoid obscuring certain aspects. This Disclosure is not limited by the illustrated ordering of acts or events, as some acts may occur in different orders and/or concurrently with other acts or events. Furthermore, not all illustrated acts or events are required to implement a methodology in accordance with the embodiments disclosed herein.

Disclosed embodiments include a MPC model-based feedback control that minimizes both smoke and noise emissions from a flare stack in a process industry. In the disclosed MPC-based control framework, the smoke and/or flare and noise forms the controlled variables (CV1 and CV2, respectively) which are controlled using an assist gas flow that is the MV. The process gas flow acts as a DV to the control system. Unlike earlier work, disclosed embodiments can consider and solve the problem of minimizing/controlling flare noise and smoke together. Moreover, earlier work generally relies on ad-hoc rule based methods to generate control inputs which are generally regarded as being unreliable.

Disclosed MPC models takes flare-related input (feedback) from standard flare monitoring/sensing devices such as an infrared (IR) sensor, optical or infrared thermal camera for sensing flare-related parameter data and a noise meter for sensing noise level data, and the MPC model relates the flare-related parameter data to process variables including at least one process gas flow as a DV. The process gas is generally a mixture of various combustible gases. Although the composition of the mixed process gas may be difficult to accurately obtain, the composition of the mixed process gas generally remains essentially the same over the days or weeks that a particular flaring process is operated. The waste gas being burned by flaring will usually be one single type. An assist gas flow is used as a MV. These process gas flow and assist gas flow variables are recognized by disclosed embodiments to have the greatest influence on the level of smoke and the flare noise generated by the flaring process.

FIG. 1 is a flow chart flow chart that shows steps in an example method 100 for reducing both smoke and noise emissions at a process industry utilizing a flaring process, according to an example embodiment. Step 101 comprises providing a MPC model for a flaring process including an assist gas comprising a plurality of identified one-to-one models between CVs including (i) at least one of a smoke count and a flare count (CV1) and (ii) a noise level (CV2), and a flow of the assist gas as a MV, and at least one other process gas flow as a (DV. There can be a plurality of DVs. As noted above, the assist gas is usually one single type. The assist gas can be steam, a combustible gas such as natural gas (NG) or propane, air or other non-combustible gas such as nitrogen.

Most design generally use either steam assisted or air assisted flaring. Gas assisted flaring is not very common except when the waste gas has low heating values. Step 102 comprises the MPC model receiving sensed flare-related parameters during operation of the flaring process including a measure of CV1 (CV1*) and CV2 (CV2*). As used herein, the "measure" of the sensed parameters refers to measurements delivered within a data sampling rate used for the particular parameter used in the system. In practice, the CVs, MVs, DVs (if measured) are available at different sampling rates, typically sampling rates ranging from milliseconds to seconds. For example, the CVs (e.g., smoke and noise) are generally sampled on the order of msecs, whereas the assist gas (MV) flow and process gas flow (DV) (if measured by a suitable flow meter) are generally sampled on the order of seconds.

A preprocessing step is generally included that includes down sampling/averaging of measurements in order to handle any inequality in sampling rates of CV1* and CV2* for synchronization to bring all measurements into one (common) sampling rate. The sensed parameters can be provided by at least one flaring process monitoring device such as optical IR sensor, optical or infrared thermal camera for smoke, and a noise meter for measuring noise. As noted above, the DV (or DVs) can be measured or unmeasured. When DVs are measured, models such as M1 and M2 described below are also present which directly assist in the calculation of future moves for MVs.

Step 103 comprises provided CV1* is above a predetermined minimum setpoint for CV1 (CV1 setpoint) and CV2* is above a predetermined setpoint for CV2 (CV2 setpoint), automatically controlling the flaring process using the MPC model to determine an updated flow setpoint for MV (future moves in MV) from (i) CV1* and CV2*, (ii) a difference between the CV1 setpoint and CV1 * and a difference between the CV2 setpoint and CV2* (these differences constitute "error"), and (iii) the identified one-to-one models (listed in step 101). If the one-to-one models do not include DV, the MPC treats the DV's effect on MV as a plant model mismatch. According to the workings of MPC, only the first move for MV is implemented and the complete calculations are repeated as the cycle continues, until the process controller is able to stabilize the CVs close to their respective setpoints.

The predetermined minimum setpoints for CV1 and CV2 are generally obtained through a manual interaction with the operator of the flaring system. The operator can be provided with multiple visual images of both flare count and/or smoke count among which he or she can select the threshold image after which he or she can take a control action and this can become the setpoint (or threshold level) for the smoke count and flare count. This step is commonly known as Ground Truth Benchmarking performed at the process industry plant' site which can generally be altered at any time.

FIG. 2 is a table showing four (4) example one-to-one process models (shown as M1, M2, M3 and M4) which can be to build a disclosed MPC model, according to an example embodiment. MPC is recognized as being able to handle one-to-one model interactions as well as unmeasured DVs. M1 is shown as CV1 being smoke or flare vs. assist gas flow as the MV (CV1 vs. M1). M2 is shown as CV1 being smoke or flare vs. the process gas flow as the DV (CV1 vs. DV). M3 is shown as CV2 being noise vs. assist gas flow as the MV (CV2 vs. MV), and M4 is shown as CV2 being noise vs. the process gas flow as the DV (CV2 vs. DV). M1, M2, M3 and M4 can each be (independently) linear or non-linear models. Other process influences such as wind speed, wind direction, or other ambient conditions represent other possible DVs which may be added by compiling additional one-one models involving the other DV.

As noted above, the process gas flow (the DV(s)) may be a MV or an unmeasured variable. There may be processing plants that do not include any flow sensor on the process gas flow stream and hence there may be no flow measurement available for the DV. If there is no flow measurement for DV, then in the MPC framework this is generally termed as "Unmeasured Disturbance Variable", and if there is a flow sensor and the DV is instead measured then it is generally termed a "Measured Disturbance Variable". Both measured and unmeasured DV's, as well as estimated DVs, are handled within the disclosed MPC framework as described below.

If the DV is a measured DV then the measure of the DV (DV*) is used in identified one-to-one models involving DV (e.g., M2 (CV1 vs. DV) and M4 (CV2 vs. DV) in FIG. 2) to together with the other one-to-one models (e.g., M1 (CV1 vs. MV) and M3 (CV2 vs. MV) in FIG. 2) arrive at the future moves for the MV. If the DV is an unmeasured DV, then for disclosed MPC implementation there are two example approaches described below. If there is no identified one-to-one models involving DV (e.g., M2 and M4 in FIG. 2, i.e. CV1 vs. DV and CV2 vs. DV), the MPC model can use the other (non-DV) one-to-one models (e.g., M1 and M3 in FIG. 2, i.e. CV1 vs. MV and CV2 vs. MV) while treating the effect of the DV on MV as a plant-model mismatch to generate future moves for MV. If the DV is not measured and cannot be estimated, then as noted above its effect on the CV can generally be treated as Plant Model Mismatch. Regarding Plant Model Mismatch, feedback control works on the principle of error, where error is the difference between measured or true plant observation and model prediction. If DV is not measured, its effect is seen in the measured or true plant observation, but not in the model prediction resulting in a significant error and generally strong aggressive feedback action by the controller to minimize the error.

Alternatively, one can create an indirect way to estimate the value of the DV and then use the DV estimate in identified one-to-one models involving DV (M2 and M4, i.e. CV1 vs. DV & CV2 vs. DV) models, and the MPC model can thus use all the one-to-one models (M1, M2, M3 and M4) shown in FIG. 2 to generate the future moves for MV. Estimation can be implemented by a Kalman Filter or Particle filter or generally any standard filtering technique.

Figure 3:
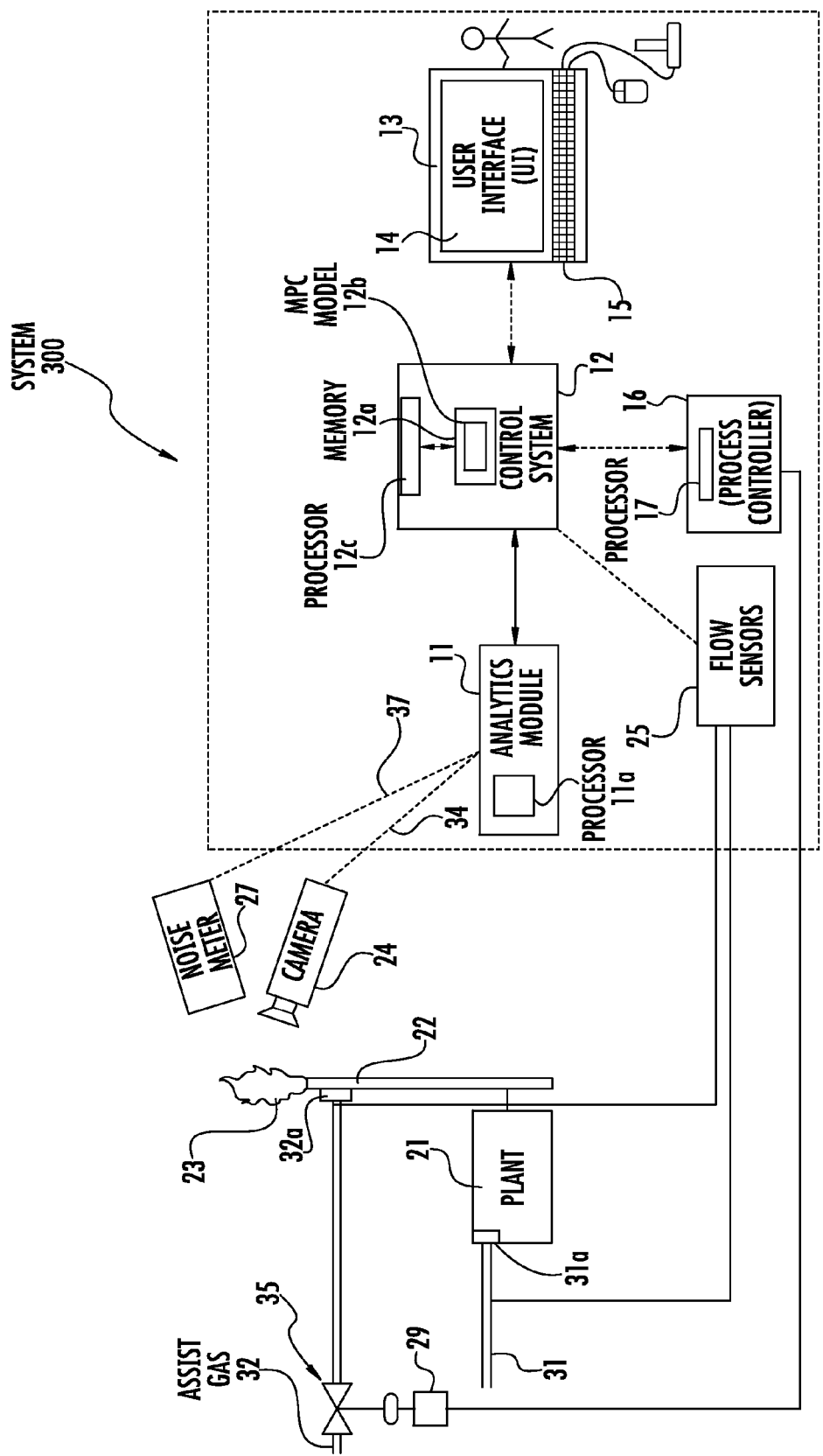
FIG. 3 is a diagram of an example flare feedback and MPC-based control system, according to an example embodiment.

FIG. 3 is a diagram of an example diagram of an example flare feedback and MPC-based control system 300, according to an example embodiment. A plant 21 having a flare stack 22 and corresponding flare (or flame) 23 and associated noise (not depicted) is to be controlled. The process run by plant 21 is shown receiving a process gas 31 and an assist gas 32. The process gas (or process gases) 31 are injected into the process run by the plant 21 by process gas injector 31a. The assist gas 32 is controlled by a valve 35 (that although shown outside of the plant 21 is generally within the plant 21) that has an actuator 29 which controls the position of the valve 35 to control the flow of the assist gas 32, which is injected by assist gas injector 32a shown just below the flare 23.

A plurality of sensors for sensing flare-related parameters during operation of the flaring process at the plant 21 are shown as camera 24 (or a plurality of cameras) is directed toward the flare 23 for video observation, while a noise meter 27 is placed in proximity of the flare 23 to allow measuring the associated noise level (typically in dB). The camera 24 may detect visible, infrared and/or ultra-violet light associated with the flare 23.

The video observation from camera 24 and noise data from noise meter 27 may be recorded in system 300, such as in the memory 12a shown within the control system 12. Control system also includes a processor 12c and memory 12a where a disclosed MPC model is shown stored therein. Control system 12 is generally a distributed control system (DCS) which includes a plurality of plant process controllers 16. A DCS as used herein refers to a control system usually being a manufacturing system in which the controller elements are not central in location, but are instead distributed throughout the system with each component sub-system controlled by one or more controllers.

The connection between system 300 and camera 24 and noise meter 27 may be either wired or wireless. Wireless embodiments will include a wireless transmitter associated with the sensors and a wireless receiver to receive the wireless signals.

Video signals 34, being digital and/or analog signals, from the camera 24 and noise data 37 from the noise meter 27 are shown coupled to an analytics module 11 having a processor 11a. In the case of analog signals, an analog-to-digital conversion by an analog-to-digital converter (ADC) is performed either before sending the sensed signals to the analytics module 11 or at the analytics module 11.

The video signals 34 provided by the camera 24 and noise data 37 from the noise meter 27 may be analyzed by analytics module 11 to determine contents and parameters of the flare 23 and noise level respectively. The analytics module 11 is shown providing analysis results to the control system 12, which may optionally then be sent to the user interface (UI) 13. The UI 13 may have a video screen or display 14 and a keyboard or like mechanism 15. Keyboard or like mechanism 15 may include a mouse, a joystick, a touch screen, and/or the like. Control system 12 also provides automatic monitoring and controlling in conjunction with plant controller or controllers 16.

Control system 12 generally includes a processor 12c to facilitate an interaction between the user interface 13, the analytics module 11 and plant controller or controllers 16. Plant controller or controllers 16 may have one or more processors 17 for control and monitoring of various plant 21 parameters. Control of the plant parameters generally include control of assist gas 32 and process gas 31 flow which as noted above are recognized to have the most significant effect on the flare 23. The flow of the assist gas 32 and flow of the process gas 31 may each be detected by suitable flow meters depicted by a single sensor block 25 having "flow sensors" shown having outputs coupled to the control system 12.

Disclosed embodiments can be applied to generally any process that includes flaring. For example, process industries such as petroleum (oil) refineries and petrochemical such as ethylene plants.

While various disclosed embodiments have been described above, it should be understood that they have been presented by way of example only, and not limitation. Numerous changes to the subject matter disclosed herein can be made in accordance with this Disclosure without departing from the spirit or scope of this Disclosure. In addition, while a particular feature may have been disclosed with respect to only one of several implementations, such feature may be combined with one or more other features of the other implementations as may be desired and advantageous for any given or particular application.

As will be appreciated by one skilled in the art, the subject matter disclosed herein may be embodied as a system, method or computer program product. Accordingly, this Disclosure can take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, this Disclosure may take the form of a computer program product embodied in any tangible medium of expression having computer usable program code embodied in the medium.

Any combination of one or more computer usable or computer readable medium(s) may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include non-transitory media including the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device.

The invention claimed is:

1. A method of reducing emissions at a processing plant, comprising:
    providing a model predictive control (MPC) model for a flaring process run at said processing plant including an assist gas comprising a plurality of identified one-to-one models between controlled variables (CVs) including (i) at least one of a smoke count and a flare count (CV1) and (ii) a noise level (CV2), and a flow of said assist gas as a manipulated variable (MV) and at least one other process gas flow as a disturbance variable (DV);
    said MPC model implemented by a processor receiving sensed flare-related parameters during operation of said flaring process including a measure of said CV1 (CV1*) and said CV2 (CV2*), and
    provided said CV1* is above a predetermined minimum setpoint for said CV1 (CV1 setpoint) and said CV2* is above a predetermined setpoint for said CV2 (CV2 setpoint), automatically controlling said flaring process using said MPC model implemented by said processor which automatically determines an updated flow setpoint for said MV based on (i) said CV1* and said CV2*, (ii) a difference between said CV1 setpoint and said CV1* and a difference between said CV2 setpoint and said CV2*, and (iii) said identified one-to-one models.

2. The method of claim 1, wherein said DV is a sensed to provide a measure of said DV (DV*) or said DV is estimated, and wherein said identified one-to-one models include said DV.

3. The method of claim 1, wherein said identified one-to-one models do not include said DV, and wherein said MPC model treats an effect of said DV on said MV as a plant-model mismatch.

4. The method of claim 1, wherein said CV1 includes said smoke count.

5. The method of claim 1, wherein said assist gas comprises steam, a combustible gas, or air.

6. The method of claim 5, wherein said assist gas comprises said steam.

7. The method of claim 1, wherein said CV1 setpoint and said CV2 setpoint are both determined by a ground truth benchmarking process.

8. The method of claim 1, further comprising implementing said updated flow setpoint for said MV using a process controller coupled to receive said updated flow setpoint for said MV which is coupled to an actuator that controls a valve position to provide said updated flow setpoint for said MV.

9. A method of reducing emissions at a processing plant, comprising:
    providing a model predictive control (MPC) model for a flaring process run at said processing plant including steam as an assist gas comprising a plurality of identified one-to-one models between controlled variables (CVs) including (i) a smoke count (CV1) and (ii) a noise level (CV2), and a flow of said steam as a manipulated variable (MV) and at least one other process gas flow as a disturbance variable (DV);
    said MPC model implemented by a processor receiving sensed flare-related parameters during operation of said flaring process including a measure of said CV1 (CV1*) and said CV2 (CV2*), and
    provided said CV1* is above a predetermined minimum setpoint for said CV1 (CV1 setpoint) and said CV2* is above a predetermined setpoint for said CV2 (CV2 setpoint), automatically controlling said flaring process using said MPC model implemented by said processor which automatically determines an updated flow setpoint for said MV based on (i) said CV1* and said CV2*, (ii) a difference between said CV1 setpoint and said CV1* and a difference between said CV2 setpoint and said CV2*, and (iii) said identified one-to-one models.

10. A system for reducing emissions at a processing plant, comprising:
    a plurality of sensors for sensing flare-related parameters including a sensor for sensing at least one of a smoke count and a flare count and a sensor for sensing a noise level emitted from a flare stack during operation of a flaring process at said processing plant;
    a model predictive control (MPC) model for controlling said flaring process including an assist gas comprising a plurality of identified one-to-one models between controlled variables (CVs) including (i) at least one of said smoke count and said flare count (CV1) and (ii) said noise level (CV2), and a flow of said assist gas as a manipulated variable (MV) and at least one other process gas flow as a disturbance variable (DV);
    a control system including a processor receiving said flare-related parameters from said plurality of sensors during operation of said flaring process including a measure of said CV1 (CV1*) and said CV2 (CV2*), said processor implementing said MPC model;
    wherein provided said CV1* is above a predetermined minimum setpoint for said CV1 (CV1 setpoint) and said CV2* is above a predetermined setpoint for said CV2 (CV2 setpoint), automatically controlling said flaring process using said MPC model implemented by said processor which automatically determines an updated flow setpoint for said MV based on (i) said CV1* and said CV2*, (ii) a difference between said CV1 setpoint and said CV1* and a difference between said CV2 setpoint and said CV2*, and (iii) said identified one-to-one models, and
    a process controller coupled to receive said updated flow setpoint for said MV from said control system which is coupled to an actuator that controls a valve position to provide said updated flow setpoint for said MV that implements said updated flow setpoint for said MV.

11. The system of claim 10, further comprising a flow sensor for sensing said DV to provide a measure of said DV (DV*) or said DV is estimated, and wherein said identified one-to-one models include said DV.

12. The system of claim 10, wherein said identified one-to-one models do not include said DV, and wherein said MPC model treats an effect of said DV on said MV as a plant-model mismatch.

13. The system of claim 10, wherein said sensor for sensing at least one of said smoke count and said flare count includes a smoke count sensor.

14. The system of claim 10, wherein said assist gas comprises steam, a combustible gas, or air.

15. The system of claim 14, wherein said assist gas comprises said steam.

16. A computer program product, comprising:
a non-transitory data storage medium that includes program instructions executable by a processor to enable said processor to execute a method of reducing emissions at a processing plant, said program instructions including:
code for said processor implementing a model predictive control (MPC) model for a flaring process run at said processing plant including an assist gas comprising a plurality of identified one-to-one models between controlled variables (CVs) including (i) at least one of a smoke count and a flare count (CV1) and (ii) a noise level (CV2), and a flow of said assist gas as a manipulated variable (MV) and at least one other process gas flow as a disturbance variable (DV); wherein said processor receives sensed flare-related parameters during operation of said flaring process including a measure of said CV1 (CV1*) and said CV2 (CV2*), and
code for checking that said CV1* is above a predetermined minimum setpoint for said CV1 (CV1 setpoint) and said CV2* is above a predetermined setpoint for said CV2 (CV2 setpoint), and
code for automatically controlling said flaring process using said MPC model provided said CV1* is above said CV1 setpoint and said CV2* is above said CV2 setpoint based on i) said CV1* and said CV2*, (ii) a difference between said CV1 setpoint and said CV1* and a difference between said CV2 setpoint and said CV2*, and (iii) said identified one-to-one models.

17. The computer program product of claim 16, wherein said DV is a sensed to provide a measure of said DV (DV*) or said DV is estimated, and wherein said identified one-to-one models include said DV.

18. The computer program product of claim 16, wherein said identified one-to-one models do not include said DV, and wherein said MPC model treats an effect of said DV on said MV as a plant-model mismatch.

19. The computer program product of claim 16, wherein said CV1 includes said smoke count.

20. The computer program product of claim 16, wherein said assist gas comprises steam.

* * * * *